United States Patent [19]

Dezso

[11] Patent Number: 4,740,057
[45] Date of Patent: Apr. 26, 1988

[54] WIRE LIKE COLUMN SPACERS UNDER A FORCE IN EXCESS OF EULER'S COLUMN LOAD

[75] Inventor: Joseph A. Dezso, Palos Verdes Estates, Calif.

[73] Assignee: Hughes Aircraft Company, Los Angeles, Calif.

[21] Appl. No.: 811,594

[22] Filed: Dec. 18, 1985

[51] Int. Cl.$^4$ ............... G02B 7/02; F16F 7/12
[52] U.S. Cl. ............... 350/252; 267/160; 285/114
[58] Field of Search ............... 350/252, 631; 188/371–377; 267/140.2, 160; 74/492; 248/576, 626, 636, 351; 285/114, 302

[56] References Cited

U.S. PATENT DOCUMENTS

| | | | |
|---|---|---|---|
| 859,215 | 7/1907 | Guilbert | 350/252 |
| 870,535 | 11/1907 | Bausch | 350/252 |
| 2,767,612 | 10/1956 | Hofer | 350/252 |
| 2,808,762 | 10/1957 | De Grave, Jr. | 350/252 |
| 3,281,166 | 10/1966 | Doughty, Jr. et al. | 285/114 |
| 3,360,081 | 12/1967 | Platus et al. | 188/373 |
| 3,511,345 | 5/1970 | Takamatsu et al. | 188/371 |
| 3,752,523 | 8/1973 | Bierbrauer | 188/371 |
| 3,819,218 | 6/1974 | Liu | 188/371 |
| 4,312,430 | 1/1982 | Ohtani | 188/377 |
| 4,431,267 | 2/1984 | Finck et al. | 350/252 |

FOREIGN PATENT DOCUMENTS

| | | |
|---|---|---|
| 2915030 | 10/1979 | Fed. Rep. of Germany . |
| 1600481 | 9/1970 | France . |
| 58-158613 | 12/1983 | Japan . |
| 675384 | 7/1979 | U.S.S.R. ............... 350/252 |

OTHER PUBLICATIONS

EP0009654, Ming Long Ting, R. "Energy Absorbing Device & Structures Erected by the Same", 4–1980.

Primary Examiner—William H. Punter
Attorney, Agent, or Firm—Leonard A. Alkov; A. W. Karambelas

[57] ABSTRACT

A spacer adapted for use in an optical system holds lenses in place within a housing. The spacer has a plurality of wire column elements which extend under critical column load between the edges of spaced-apart lens elements. The wires are preformed with a bend which directs any lateral deflection parallel to a surface of the housing and out of the light ray space of the lenses. The ends of the wires are received in holes formed in a pair of spaced-apart, arcuate end members which extend circumferentially along peripheral surfaces of the lenses. The outer surfaces of the end members are shaped to mate with corresponding abutting surfaces of the lenses.

16 Claims, 2 Drawing Sheets

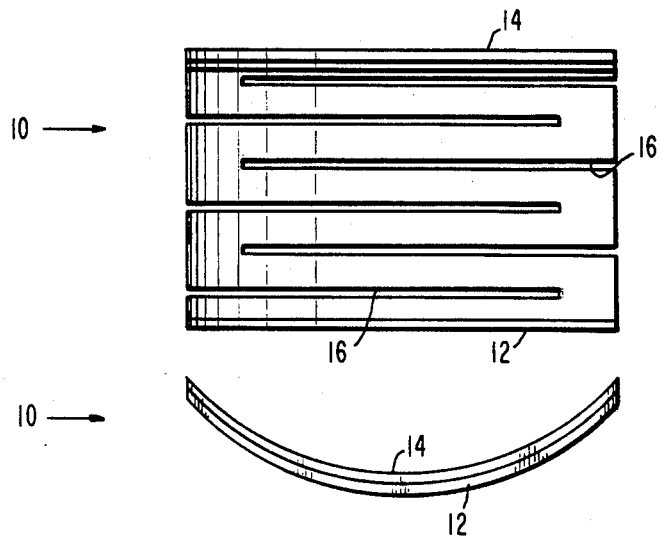
Fig. 1. (PRIOR ART)
Fig. 2. (PRIOR ART)
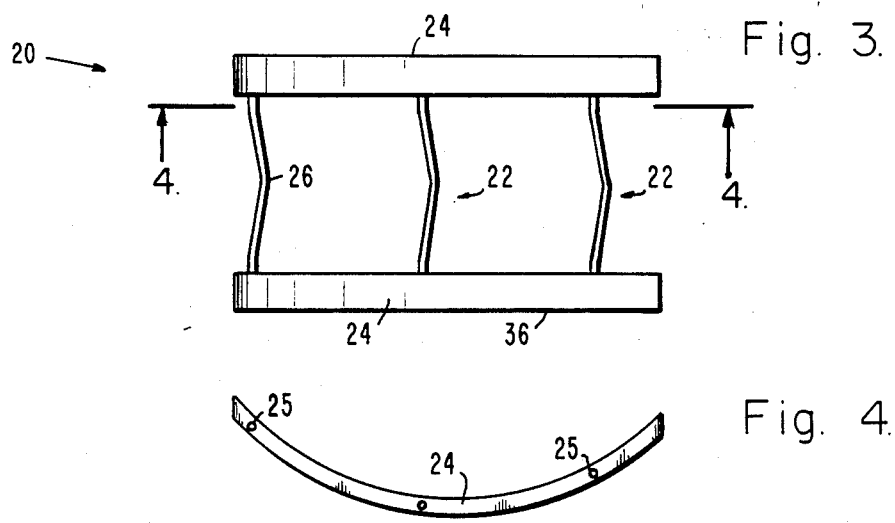
Fig. 3.
Fig. 4.

WIRE LIKE COLUMN SPACERS UNDER A FORCE IN EXCESS OF EULER'S COLUMN LOAD

BACKGROUND OF THE INVENTION

This invention relates generally to spacers and, more particularly, has reference to a spacer which is capable of producing a force and taking up a tolerance to hold elements in place in an assembly. The invention is particularly suited for adaptation to an optical assembly where it can be used to hold optical elements, such as lenses, in place within a housing.

A common need which arises in numerous types of mechanical and other assemblies or structures is to hold elements or components in desired locations within the assembly or structure without permanently affixing them thereto or integrating them therewith. Various mechanical retaining devices have been designed to perform this function.

One particular type of assembly of interest is the optical assembly, known as the relay lens, which is found in a head-up display. As described in detail in U.S. Pat. No. 3,940,204, a head-up display is an optical display system, typically found in the cockpit of military fighter aircraft, which enables a pilot to see an artificially generated display of information superimposed on his view of the outside world. The relay lens consists of a housing assembly, generally in the form of a hollow, cylindrical, barrel-like structure, which contains a longitudinal or axial stack of optical lenses arranged in predetermined sequence and relative orientation so as to define a light path through the housing assembly. In order for the relay lens to perform its intended optical function, the individual lens elements must be held in specified positions and orientations within the housing. Mechanical lens spacers have been used to perform that function. The lens elements generally cannot be permanently affixed to or integrated with the housing assembly without adversely affecting their optical properties.

The spacers used in head-up displays must be capable of developing sufficiently high load to hold the lens elements in place under the severe forces and vibrations often encountered in military fighter aircraft. Moreover, they must be capable of holding the lenses in place to the close tolerances needed to assure correct optical performance of the display system. In addition, the spacers must be designed to minimize weight which is always an important factor for fighter aircraft.

Spacers capable of producing a force and taking up a tolerance are known. However, these known spacers operate on the spring principle, i.e., they are designed to be compressed or deflected to develop the force or load needed to hold elements in place. A known spacer of this type specifically designed for use in a head-up display system is shown and described in detail below.

Known spacers operating on the spring principle suffer numerous deficiencies. Because they are designed to be compressed or deflected, they generally have relatively complex structures which are heavy, costly and difficult to manufacture. Their inherent compressibility makes them susceptible to loss of tolerance. In addition, they have often been found incapable of producing sufficient load to hold elements in place under all operating conditions.

Hence, a need exists for a new type of spacer which is lighter, less expensive and easier to manufacture than spring-type spacers and which is capable of producing high loads with little or no compression or deflection.

SUMMARY OF THE INVENTION

The present invention overcomes the problems which exist in the prior art.

The present invention provides a spacer which can be positioned between spaced-apart elements in an asembly to hold one or both of the elements in desired locations within the assembly. The spacer includes one or more column members configured to fit between the elements upon exceeding critical column load. By behaving generally in accordance with Euler column load principles, rather than spring principles, the spacer of the present invention is capable of developing high load with very little axial deflection. In addition, its relatively simple column structure makes it lightweight and inexpensive to manufacture.

In its preferred embodiment, the spacer of the present invention is adapted for use in an optical system, such as the relay lens of a head-up display, to hold lenses in place within a housing. The spacer has a plurality of wire column elements which extend under critical column load between the edges of spaced-apart lens elements within a lens housing assembly. The wires are preformed with a bend which directs any lateral deflection parallel to a surface of the housing and out of the light ray space of the lenses. The ends of the wires are received in holes formed in a pair of spaced-apart, arcuate end members which extend circumferentially along peripheral surfaces of the lenses. The outer surfaces of the end members are shaped to mate with corresponding abutting surfaces of the lenses.

Objects of the invention are, therefore, to provide improved spacer apparatus and to provide spacer apparatus which is capable of developing high load with little or no deflection.

Another object of the invention is to provide spacer apparatus which is simple in structure, light in weight and inexpensive to manufacture.

A further object of the invention is to provide spacer apparatus which behaves according to the Euler column load principles.

A further object of the invention is to provide spacer apparatus for holding lenses in place within a particular load range in an optical assembly.

Yet another object of the invention is to provide spacer apparatus which is capable of producing a force and taking up a tolerance in an assembly, especially an optical assembly including a plurality of lens elements.

Yet another object of the invention is to provide spacer apparatus for positioning between spaced-apart elements in an assembly to hold at least one of said elements in a desired location within said assembly comprising one or more column members configured to extend between said elements upon exceeding critical column load.

Still another object of the invention is to provide an optical assembly comprising a housing, one or more optical elements positioned within the housing, and spacer apparatus for holding at least one of said optical elements in a desired location within said housing, said spacer apparatus comprising one or more column members under critical column load extending between said optical elements and a surface fixed with respect to said housing.

These and other and further objects and features of the invention are apparent in the disclosure which includes the above and below specification and claims and drawings.

BRIEF DESCRIPTION OF THE DRAWINGS

FIG. 1 is a plan view of a known lens spacer used in the relay lens of a head-up display.

FIG. 2 is a side elevational view of the lens spacer shown in FIG. 1.

FIG. 3 is a plan view of a spacer embodying features of the present invention.

FIG. 4 is a side elevational view taken along the line 4—4 in FIG. 3.

DESCRIPTION OF THE PREFERRED EMBODIMENTS

Figure 5:
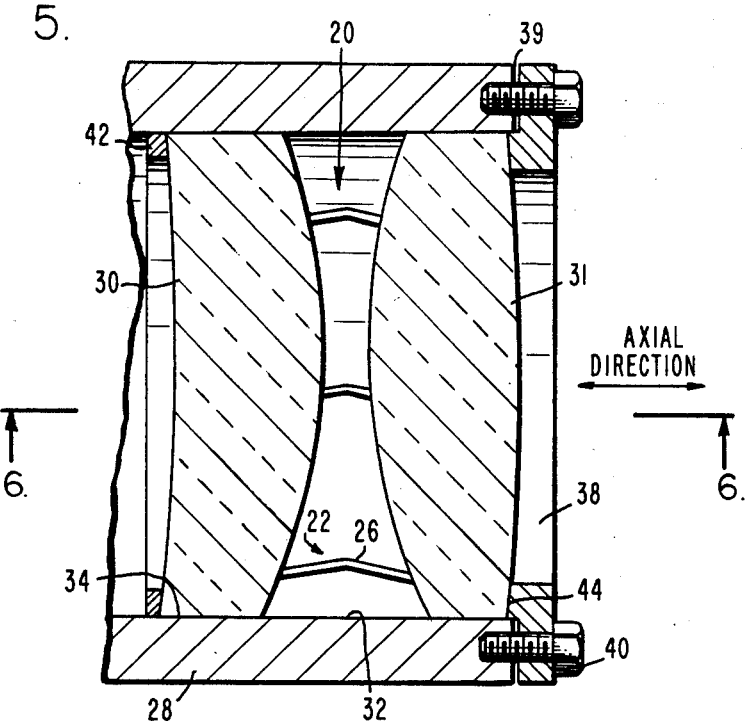
FIG. 5 is a fragmentary top view, in section, showing the spacer of FIG. 3 in use in an optical assembly.

The known spring-type spacer referred to above for use in a head-up display is shown in detail in FIGS. 1 and 2 and is generaly indicated by the numeral 10.

The spacer 10 is formed from a unitary, arcuate piece of corrosion-resistant steel. The curvature is chosen to match the perimetric shape of the lens elements used in the relay lens of the head-up display. The ends 12 and 14 of the spacer 10 are shaped to mate with the lens or housing surfaces which they will abut when the spacer 10 is installed. One end 14 is formed as a raised, lip-like structure to enable it to make substantial contact with an abutting lens surface.

A series of parallel lateral slots 16 are cut in the spacer 10 during manufacture. Adjacent slots 16 begin at opposite sides of the spacer 10 and typically extend across only about 85% of the width of the spacer 10. The slots 16 are sized and spaced so that the spacer 10 becomes resiliently compressible in the longitudinal direction. The resiliency of the spacer 10 can be enhanced by conditioning the material with conventional heat treatments.

In use, the spacer 10 is compressed and positioned in a relay lens housing between a lens element and a surface fixed with respect to the housing. Typically, the relay lens housing is a generally cylindrical or barrel-like structure which surrounds a longitudinal or axial stack of lens elements and contacts the outer edges thereof. The spacer 10 is preferably positioned adjacent an inner surface of the housing to minimize interference with light rays passing through the lenses. One end 12 of the spacer 10 abuts a fixed surface which extends inwardly from the inner wall of the housing and is longitudinally spaced from a corresponding lens element by a distance which is slightly smaller than the longitudinal dimension of the spacer 10. Hence, the spacer 10 is compressed when positioned between the fixed surface and the lens element, causing the respective ends 12 and 14 of the spacer 10 to push outwardly against the fixed surface and lens element and apply forces thereto. The force applied by the end 14 of the spacer 10 to the surface of the lens element tends to hold that portion of the lens element in place.

Figure 6:
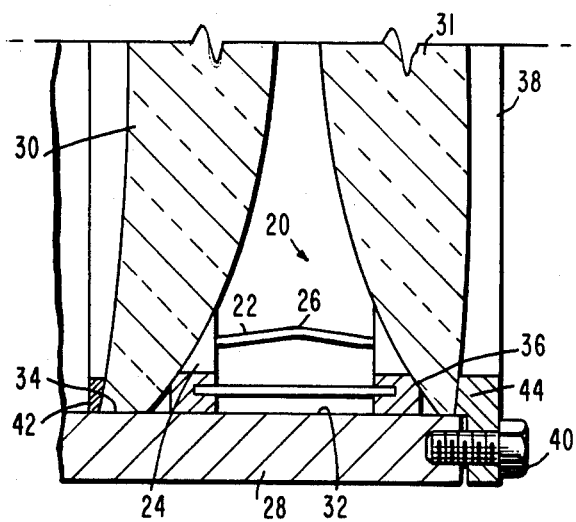
FIG. 6 is a fragmentary side view, in section, taken along the line 6—6 in FIG. 5.

A spacer embodying features of the present invention, indicated generally by the numeral 20, is shown in isolation in FIG. 3 and is shown in use in an optical assembly in FIGS. 5 and 6.

Referring to FIG. 3, the spacer 20 has a plurality of laterally-spaced column members 22 which extend between a pair of longitudinally-spaced end members 24.

As shown in FIG. 4, the end members 24 are elongate, arcuate elements provided with holes 25 on their inward facing surfaces which receive the ends of the column members 22. Preferably, the ends of the column members 22 are bottomed in the holes 25 and may, if desired, be glued, welded or otherwise permanently attached to the end members 24 in accordance with conventional techniques.

Each of the column members 22 is preformed with an eccentricity 26, preferably a bend or kink in the column 22, which controls the direction of lateral deflection of the column 22 when an axial load exceeding the critical Euler column load is applied thereto. It will be apparent that the column 22 will continue to deflect laterally in the direction established by the eccentricity 26 when sufficient axial load is applied to cause the column 22 to buckle. The eccentricities 26 are designed to insure that lateral deflection occurs in a direction which minimizes interference with the assembly in which the spacer 20 is used. For reasons that will become apparent from the detailed descriptions of FIGS. 5 and 6 below, it is preferred that the eccentricities 26 be directed parallel to the end members 24.

The magnitude and location of the eccentricity 26 on the columns 22 are not critical so long as they are adequate to ensure that the columns 22 will deflect in the desired lateral direction when they buckle. Hence, those parameters can be varied as desired to suit particular needs.

The column members 22 behave substantially as Euler columns when inward longitudinal force is applied to the end members 24. A Euler column is a well-known mechanical concept defined by the expression:

$$P_E = \frac{\pi^2 EI}{L_e^2}$$

where
$P_E$ is the Euler column load,
E is the modulus of elasticity,
I is the moment of inertia, and
$L_e$ is the effective length of the column.

The Euler column load, or critical load, is the amount of axial force which can be developed by the column before buckling occurs. There is little or no deflection of the column at critical column load.

The spacer 20 of the present invention, operating according to the Euler columm load principles, can be compared to the prior spacer 10, which operates according to conventional spring principles. A conventional spring behaves according to the expression:

$$F = KX$$

where
F is the force developed by the spring,
K is the spring constant, and
X is the amount of axial deflection of the spring.

By comparing the expression governing behavior of the conventional spring with the expression governing behavior of the Euler column, it will be apparent that the spacer 20 of the present invention, unlike the prior spacer 10, is capable of developing its maximum load with almost no deflection because there is no variable for deflection in the Euler column load expression.

The amount of load developed by the spacer 20 can be tailored to meet particular design requirements by varying any of a number of parameters, such as the diameter or length of the individual column members 22, the total number of column members 22 used, or the spacings between the column members 22. The use of three column members spaced as shown in FIG. 3 is merely exemplary. The number of column members 22 can be as few as one or as numerous as needed to produce a desired load. The use of three columns 22 has the advantage of assuring that all of the column ends are bottomed in the holes 25 in the side members 24. The spacing between column members 22 can be increased or decreased from that shown in FIG. 3 without departing from the present invention.

The critical column load can also be changed by varying the material used to make the column members 22. Generally, the present invention contemplates forming the column members 22 from any conventional spring material or spring wire, such as piano wire. In a preferred embodiment, the column members 22 are formed of corrosion-resistant steel wire.

The resiliency of the column members 22 can be further enhanced by heat treating them in accordance with known techniques. A preferred treatment involves heating at 900° F. for 1 hour after the eccentricities 26 have been preformed in the columns 22.

The end members 24 can be formed of any suitable material. A preferred material is black anodized aluminum alloy.

The spacer 20 of the present invention is lighter and less expensive than the prior spacer 10 and is capable of producing much greater force. A representative spacer constructed as shown in FIG. 3 weighed about 0.036 pounds and was capable of producing an installed load of 80–150 lbs. A corresponding spacer made as shown in FIG. 1 weighed about 0.136 pounds and was capable of producing an installed load of only about 30 lbs. In addition, the latter spacer cost nearly three times as much to manufacture as the spacer made in accordance with the present invention.

Use of the spacer 20 of the present invention can be best understood by reference to FIGS. 5 and 6 which depict the spacer 20 installed in an optical assembly typical of the relay lens found in a head-up display.

The optical assembly includes a generally cylindrical, barrel-like housing 28 which encloses a stack of lenses 30 and 31 arranged side-by-side down the length of the housing 28. The lenses 30 and 31 and housing 28 are constructed and arranged so that the inner surface 32 of the housing 28 abuts the outer edges 34 of the lenses 30 and 31 around their entire perimeter. Light entering the housing 28 at one end passes through the lenses 30 and 31 in sequence and exits out the other end of the housing 28. The lenses 30 and 31 are designed to affect the optical properties of the light in a desired manner.

The spacer 20 is designed to hold lenses in place in the housing 28. As shown in the exemplary embodiment of FIGS. 5 and 6, the spacer 20 may be positioned between a pair of lenses 30 and 31 to hold both lenses in place. However, it is understood that the spacer 20 could be used to hold a single lens in place by positioning the spacer 20 between that lens and a fixed surface, such as a shoulder 42 formed on the inner surface 32 of the housing 28.

The longitudinal dimension of the spacer 20 is slightly larger than the distance between the lenses or surfaces which the spacer 20 is intended to abut when installed. The dimensional mismatch is designed to cause the critical column load of the column members 22 to be exceeded when the spacer 20 is installed. However, the mismatch is less than that needed to cause total buckling of the column members 22. As a result, the spacer 20 applies an outward longitudinal force or load to the abutting lenses or surfaces to hold the lenses in place within a particular load range.

Referring again to FIGS. 5 and 6, it will be noted that, in the preferred embodiment, the end members 24 of the spacer 20 are provided with an arcuate shape which matches the curvature of the inner surface 32 of the housing 28. That arrangement provides a well-fitting assembly. However, it is understood that the shape of the end members 24 can be varied to suit particular needs and could, in certain instances, be flat.

It is further noted that, in the preferred embodiment, the spacer 20 is positioned adjacent the inner surface 32 of the housing 28 so that the end members 24 abut peripheral surfaces of the lenses 30 and 31 and the column members 22 extend away from the lenses 30 and 31 in a direction substantially parallel to the inner surface 32 of the housing 28. That arrangement is preferred because it minimizes interference with the light ray path through the lenses 30 and 31.

In the preferred embodiment, the outer surfaces 36 of the end members 24 are configured to mate with the corresponding surfaces of the lenses 30 and 31 which the end members 24 abut. That arrangement promotes intimate contact between the end members 24 and the lenses 30 and 31 and contributes to the desired goal of holding the lenses 30 and 31 in place to a close tolerance.

If desired, the end members 24 can be made to extend around the entire periphery of the lenses 30 and 31, either as unitary continuous elements or as a sequence of separate elements placed end-to-end. However, that arrangement is not essential and may, in fact, be undesirable where the lenses have an unusual or irregular perimetric shape. For example, the lenses 30 and 31 shown in FIGS. 5 and 6 have generally circular top and bottom perimeters but, could have truncated side perimeters (not shown). The lenses 30 and 31 are held in place by two separate and identical spacers 20, one of which extends along the bottom perimeter and the other of which extends along the top perimeter. No spacers are needed along the truncated side perimeters.

As best shown in FIG. 5, the column members 22 in the preferred spacer 20 are preformed with eccentricities 26 which are directed parallel to the end members 24. As a consequence, any lateral deflection of the column members 22 will be in a direction substantially tangential to the adjacent edges 34 of the lenses 30 and 31. Column members 22 which deflect in that direction cause little or no intrusion into light ray space and thus do not interfere with the light rays traveling through the lens assembly.

Although various methods can be contemplated for installing the spacer 20 in a lens assembly, a preferred method can be understood by reference to FIGS. 5 and 6.

Removal of a ring-shaped retainer cap 38, detachably secured to one end of the housing 28 by screws 40, permits access to the interior of the housing 28. A first lens element 30 is inserted into the housing 28 until it abuts against an annular shoulder 42 formed on the inner surface 32 of the housing 28. The spacers 20 are then inserted into the housing 28 along the inner surface 32 until the innermost end members 24 come into contact with the first lens element 30. A second lens element 31 is then inserted into the housing 28 until it comes into contact with the outermost end members 24 of the spacers 20. The cap 38 is then positioned on the end of the housing 28 and fixed in place by tightening down the screws 40. The cap 38 has an inwardly extending collar 44 which is urged against the second lens element 31 as the screws 40 are tightened. The assembly is constructed and arranged so that the collar 44 applies sufficient force to the second lens element 31 to develop a load in the spacers 20 in excess of the critical column load with a small amount of axial deflection of the column members 22 equal to the gap 39 between the housing 28 and the cap 38. The screws 40 may be tightened until the gap 39 is eliminated and the cap 38 is firmly against the housing 28. The gap is generally equal to the theoretical tolerance build-up of all members in the system. The spacers 20 thus apply a load to the lenses 30 and 31 to take up any tolerance and hold the lenses 30 and 31 in place in the housing 28.

While the invention has been described with reference to specific embodiments, the exact nature and scope of the invention is defined in the following claims.

What is claimed is:

1. Spacer apparatus for positioning at least one element in a hollow housing to hold the at least one element in a desired location under force along an axis within the housing comprising:

at least one end member configured to abut and operable to hold the at least one element;

at least one wire like column member connected at one end thereof to said at least one end member and the other end thereof being secured whereby a compressive force extending axially along said wire-like column member is operable to hold the element at a desired location in the housing under a predetermined substantially constant force upon exceeding the critical column load of said at least one wire-like column member.

2. The spacer apparatus of claim 1 wherein said at least one wire-line column member is preformed with an eccentricity configured to control the direction of lateral deflection of said column member in a direction substantially tangentially to the edge of the at least one element.

3. The apparatus of claim 2 wherein the eccentricity comprises a bend in the column member.

4. The apparatus of claim 3 wherein the bend is formed in a direction generally parallel to a tangent to an edge of the at least one element.

5. The apparatus of claim 1 wherein said at least one wire-like member comprises a wire having a generally rounded cross-section.

6. The apparatus of claim 1 in which the at least one element includes two elements and further comprising two end members individual ones thereof being positioned on opposite ends of said at least one column member for abutting a respective one of the elements.

7. The apparatus of claim 6 wherein said end members have surfaces configured to mate with corresponding abutting surfaces of the elements.

8. The apparatus of claim 6 wherein said end members are provided with holes for fixedly receiving said ends of the column members.

9. The apparatus of claim 6 wherein said end members comprise a pair of spaced-apart elongate elements configured to abut an inner wall of the housing, and said at least one wire-like column member includes a plurality of spaced-apart column members disposed in spaced-apart relationship extending between said elongate elements.

10. The apparatus of claim 9 wherein the elongate elements have a shape to mate with the inner surface of the housing.

11. Optical assembly comprising:

a hollow housing having a light ray space therein; at least one optical element slidably positioned within said housing; and spacer apparatus for holding said at least one optical element in a desired location along an axis within said housing, said spacer apparatus comprising at least one end member operable to abut and hold said at least one optical element, at least one wire-like column member connected to said at least one end member and extending between said at least one optical element and a surface fixed with respect to said housing said at least one column member being under columnar load at or about the critical column load with virtually none to very little deflection of said at least one column member.

12. The apparatus of claim 11 wherein the end of said at least one wire-like column member adjacent said at least one optical element is positioned adjacent an edge of said optical element and said end member is configured to conform to the abutting surface of said optical element.

13. The apparatus of claim 12 wherein the column member extends away from said optical element in a direction substantially tangential to a surface of said housing.

14. The apparatus of claim 11 wherein the column members are preformed with an eccentricity configured to direct lateral deflection of the column members substantially tangentially to the edge of said at least one optical element out of the light ray space of said housing.

15. The apparatus of claim 11 in which said at least one end member includes two end members positioned on ends of said wire-like column member adjacent said at least one optical element for abutting said optical element, said end members having a surface configured to mate with corresponding abutting surfaces of said optical element.

16. The apparatus of claim 11 in which said at least one column member includes a plurality of column member disposed in spaced apart generally parallel relationship relative to one another and extending between said end members in a direction generally parallel to the housing axis.

* * * * *